United States Patent
Yuki

[19]
[11] Patent Number: 6,163,469
[45] Date of Patent: Dec. 19, 2000

[54] RUSH CURRENT LIMITING DEVICE FOR POWER CIRCUIT

[75] Inventor: Hitoshi Yuki, Miyagi, Japan

[73] Assignee: Sony Corporation, Tokyo, Japan

[21] Appl. No.: 09/334,642

[22] Filed: Jun. 17, 1999

[30] Foreign Application Priority Data

Jun. 29, 1998 [JP] Japan .................................. 10-182283

[51] Int. Cl.[7] .............................................. H02H 7/125
[52] U.S. Cl. ............................ 363/53; 363/49; 323/908
[58] Field of Search .................................. 323/901, 908; 363/50, 53, 52, 127, 89, 49

[56] References Cited

U.S. PATENT DOCUMENTS

| | | | |
|---|---|---|---|
| 4,321,447 | 3/1982 | Lamb | 323/908 |
| 4,555,741 | 11/1985 | Masaki | 323/908 |
| 4,814,966 | 3/1989 | Ekstrand | 363/89 |
| 5,187,653 | 2/1993 | Lorenz | 363/89 |
| 5,287,263 | 2/1994 | Shilo | 363/143 |
| 5,574,632 | 11/1996 | Pansier | 363/49 |
| 5,619,127 | 4/1997 | Warizaya | 323/908 |
| 5,715,154 | 2/1998 | Rault | 363/89 |

*Primary Examiner*—Peter S. Wong
*Assistant Examiner*—Bao Q. Vu
*Attorney, Agent, or Firm*—Ronald P. Kananen; Rader, Fishman & Grauer

[57] ABSTRACT

A rush current limiting device capable of restraining increased power consumption and heat generation caused by resistance for limiting rush current, and effectively limiting rush current caused on any conditions has. A resistance for limiting rush current caused by switching of a power switch between a rectifier diode bridge and a smoothing condenser. A triode AC switch and the relay are provided in parallel with the resistance. The on-operation of a power switch is monitored by the input monitoring circuit, and an triode AC switch is turned on at the zero crossing point of input signals after the on-operation by the zero crossing circuit to short-circuit the resistance. After a delay of the relay due to sensitive time, the relay is turned on by a relay driving circuit, and the triode AC switch is turned on.

20 Claims, 5 Drawing Sheets

VOLTAGE OF ①

CURRENT OF ②

CURRENT OF ③

CURRENT OF ④

FIG. 3
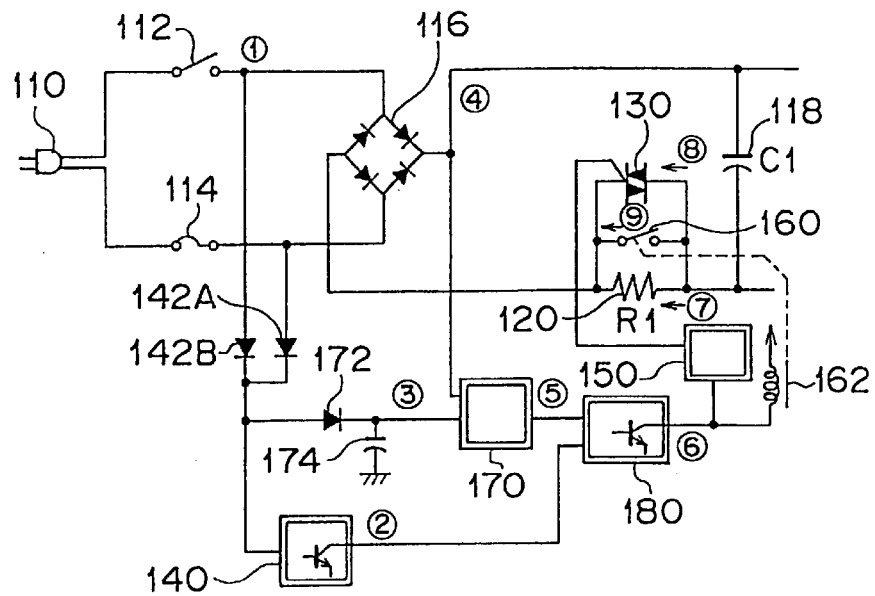
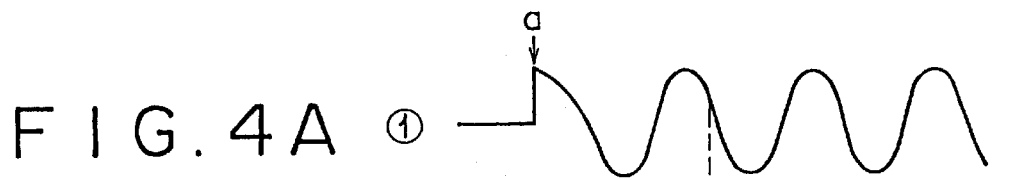
FIG. 4A ①
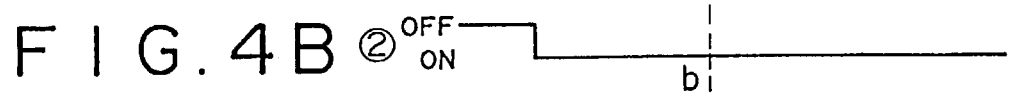
FIG. 4B ② OFF/ON
FIG. 4C ③/④ ③
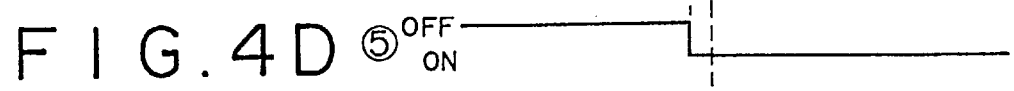
FIG. 4D ⑤ OFF/ON
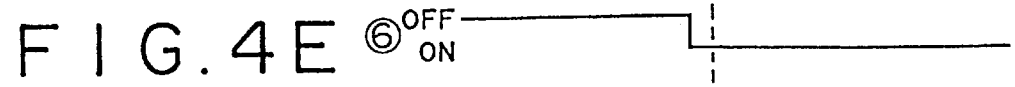
FIG. 4E ⑥ OFF/ON
FIG. 4F ⑦
FIG. 4G ⑧
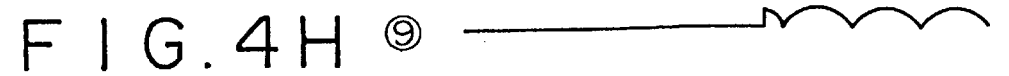
FIG. 4H ⑨

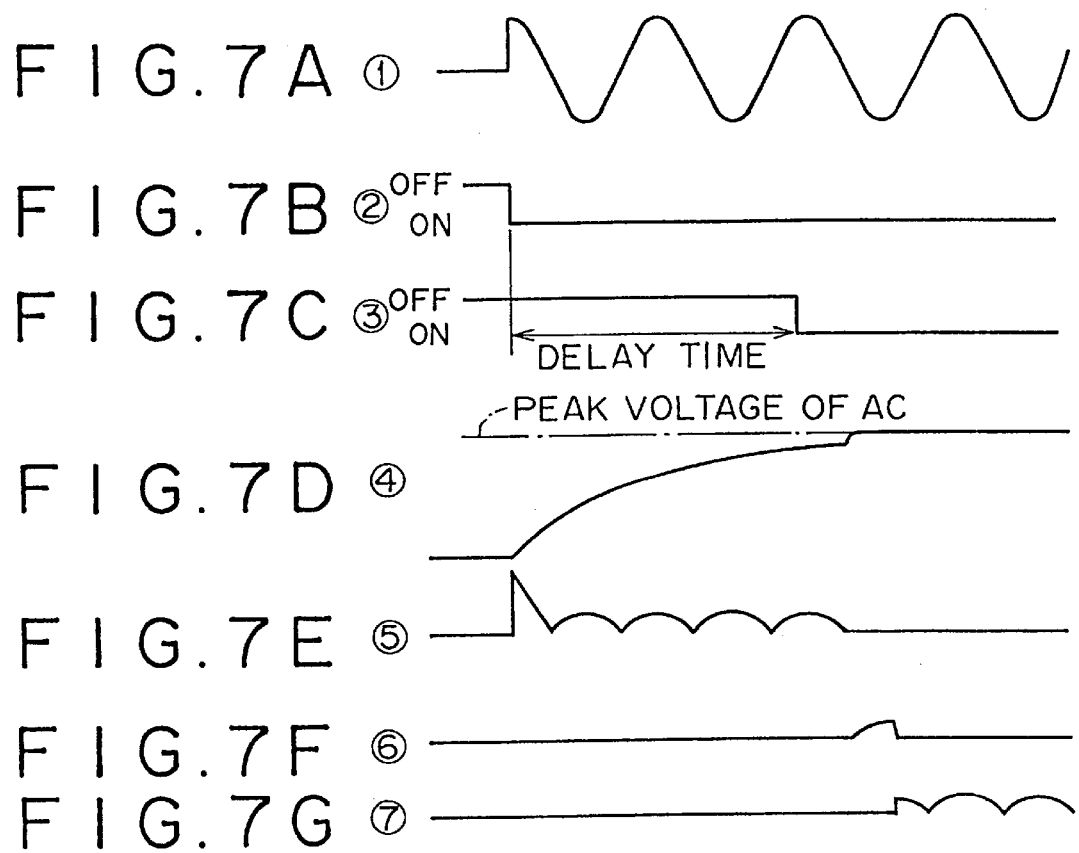
PRIOR ART FIG. 8
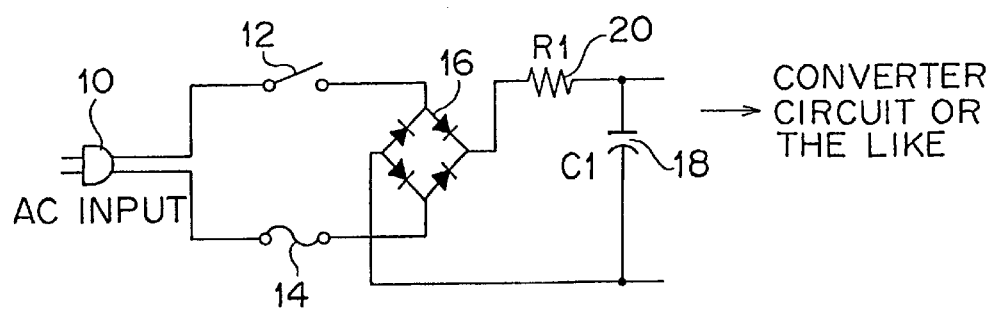

RUSH CURRENT LIMITING DEVICE FOR POWER CIRCUIT

BACKGROUND OF THE INVENTION

1. Field of the Invention

The present invention relates to a rush current limiting device to be provided for a power circuit.

2. Description of the Related Art

FIG. 8 is a circuit diagram showing structure of a rectifying smoothing circuit for an AC power source to be provided for, for example, a switching power unit or the like.

In this circuit, an AC power source inputted from a convenience outlet 10 is rectified by a rectifier diode bridge 16 through a switch 12 and a fuse 14, and is smoothed by a smoothing condenser 18 to be supplied to a converter circuit (not shown) or the like in the latter stage.

This circuit is provided with a resistance 20 for limiting rush current when the switch 12 is thrown in the preceding stage of the smoothing condenser 18. This prevents a circuit element (rectifying device, fuse or the like) from being damaged because excessive current flows when the switch 12 is thrown.

In a case, however, where there is provided such a resistance 20, in the case of a large-output power unit having a small difference between current value to be limited and current value to be inputted to the power source, or the like, there is the problem that the amount of heat generated by the resistance 20 becomes great because electric power consumed by a limiting resistance 20 during operation becomes great.

There is already known a circuit in which, as shown in FIG. 9, the current when the switch 12 is thrown is limited using a thermistor 22 in place of the resistance 20, and thereafter the current can be increased by decreasing the resistance by self-heat generation of the thermistor 22.

There is also known a circuit in which, as shown in FIG. 10, a relay 24 is provided in parallel with the resistance 20, this relay is controlled by a control circuit 26, and after the switch 12 is thrown, the resistance 20 is short-circuited at fixed timing to thereby restrain the power consumption by the resistance 20.

There is further known a circuit in which, as shown in FIG. 11, a triode AC switch 28 is provided in parallel with the resistance 20. This triode AC switch is controlled by a control circuit 30, and after the switch 12 is thrown, the resistance 20 is short-circuited at fixed timing to thereby restrain the power consumption by the resistance 20.

In a case, however, where the thermistor 22 is used as shown in FIG. 9, it becomes impossible to limit the rush current while the resistance value remains low for a condition that the switch 12 is thrown again with the thermistor 22 in a high-temperature state.

In a case where the relay 24 is used as shown in FIG. 10, while a fixed amount or more of current is flowing through the resistance at a timing at which the relay 24 operates, the voltage difference is to short-circuit the relay 24, and large current flows at that point of time. In order to prevent this flow, it is necessary to strictly control the operation timing of the relay 24, but it is, in many instances, impossible to control when using a mechanical relay 24.

Also, in a case where the triode AC switch 28 is provided as shown in FIG. 11, it is comparatively easy to control the timing, but there is the problem that when the input current becomes great, the power consumption at the triode AC switch 28 becomes great owing to the existence of on-voltage (about 1V) of the triode AC switch 28, thus causing it to generate heat.

SUMMARY OF THE INVENTION

It is an object according to the present invention to provide a rush current limiting device capable of restraining increased power consumption and heat generation based on limiting resistance of rush current, and effectively limiting rush current on any conditions.

In order to achieve the above-described object, there is provided, according to the present invention, a power circuit having a rectifier circuit for rectifying AC electric power inputted from an input unit; a smoothing circuit for smoothing rectified power from the rectifier circuit; and a power switch for turning on/off the input from the input unit, characterized as comprising: resistance means for limiting rush current provided between the rectifier circuit and the smoothing circuit; semiconductor switching means connected to the resistance means in parallel, for short-circuiting between the rectifier circuit and the smoothing circuit; mechanical switching means connected to the resistance means and the semiconductor switching means in parallel, for short-circuiting between the rectifier circuit and the smoothing circuit; and control means for monitoring power input by an on-operation of the power switch to sequentially control a short-circuiting operation in the semiconductor switching means and the mechanical switching means.

In a rush current limiting device according to the present invention, immediately after the power switch is turned on, the current, which flows from the rectifier circuit to the smoothing circuit, is limited by the resistance means for limiting the rush current.

Thereafter, monitoring the input of a power source by the power switch, the semiconductor switching means is turned on at a timing at, in which current value at the resistance means is small, and a line between the rectifier circuit and the resistance means of the smoothing circuit is short-circuited.

Thereafter, the mechanical switching means is turned on at predetermined delay timing to short-circuit the line between the rectifier circuit and the resistance means and the semiconductor switching means in the smoothing circuit.

As described above, by sequentially short-circuiting the line between the rectifier circuit and the resistance means of the smoothing circuit by the semiconductor switching means and the mechanical switching means, it is possible to prevent the rush of on any conditions and to solve the problems of heat generation, power consumption and the like.

BRIEF DESCRIPTION OF THE DRAWINGS

FIG. 3 is a circuit diagram showing an example of a second structure of a rush current limiting device according to the present invention;

FIGS. 4A to 4H are a timing chart showing signal waveforms in each portion of the rush current limiting device shown in FIG. 3;

FIGS. 7A to 7G are a timing chart showing signal waveforms in each portion of the rush current limiting device shown in FIG. 6;

FIG. 8 is a circuit diagram showing an example of a first structure of a conventional rush current limiting device;

DETAILED DESCRIPTION OF PREFERRED EMBODIMENTS

Hereinafter, the description will be made of embodiments of a rush current limiting device according to the present invention.

Figure 1:
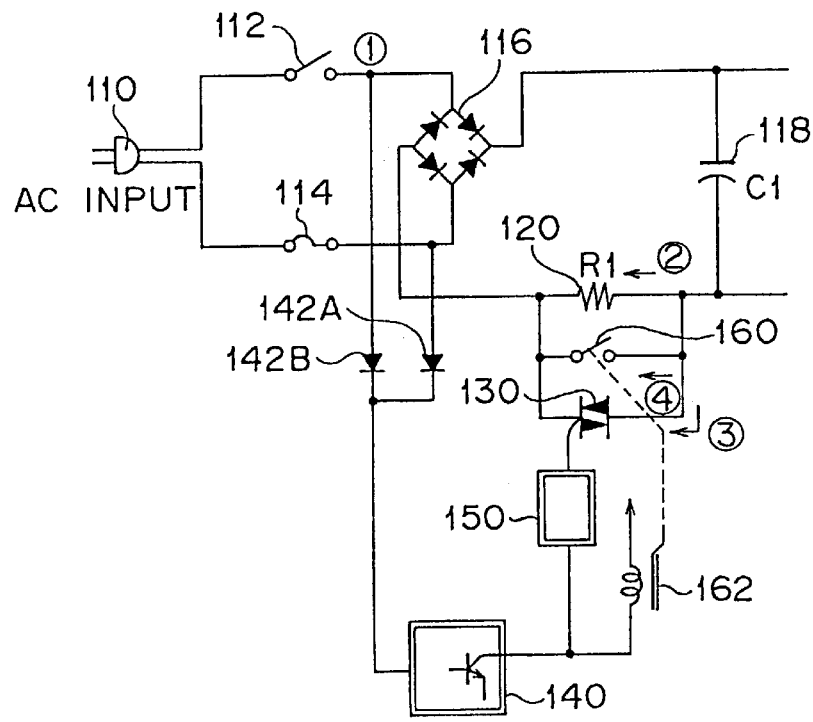
FIG. 1 is a circuit diagram showing an example of first structure of a rush current limiting device according to the present invention.

FIG. 1 is a circuit diagram showing an example of a first structure of a rush current limiting device according to the present invention, and FIG. 2 having FIGS. 2A to 2D, a timing chart showing signal waveforms in each portion (① to ④ of FIG. 1) of the rush current limiting device shown in FIG. 1.

A rush current limiting device of this example is provided for a switching power circuit having an auxiliary power circuit (not shown) for driving a control circuit for controlling a rush current limiting device of this example therein.

This switching power circuit full-wave rectifies AC power from a source inputted from a convenience outlet 110 by a rectifier diode bridge 116 through a power switch 112 and a fuse 114, and smooths the AC power by a smoothing condenser 118 to supply to a converter circuit (not shown) or the like in the latter stage.

This circuit is provided with a resistance 120 (resistance means) for limiting rush current when the power switch 112 is thrown to one line to which the rectifier diode bridge 116 is connected to the smoothing condenser 118.

Also, a triode AC switch 130 (semiconductor switching means) is connected to the resistance 120 in parallel, and further a relay (mechanical switching means) 160 is connected to the resistance 120 and the triode AC switch 130 in parallel.

This circuit is also provided with an input monitoring circuit 140 for monitoring the power input caused by an on-operation of the power switch 112. In this input monitoring circuit 140, a half-wave rectification signal obtained from each output end side of the power switch 112 and the fuse 114 through diodes 142A and 142B respectively is wired OR for input, and a detection signal for the on-operation of the power switch 112 is supplied to a zero crossing circuit 150 and a relay driving circuit 162 in the latter stage.

When an input potential from the input monitoring circuit 140 is 0V, the zero crossing circuit 150 supplies a driving signal, to the triode AC switch 130, which turns on at a zero crossing point of AC signals of the power switch 112 on the output end (① (as shown as) of FIG. 1) side, and uses a photo triode AC switch incorporating, for example, a zero crossing circuit therein.

By this zero crossing circuit 150, the triode AC switch 130 turns on at the zero crossing point of the AC signals. When the triode AC switch turns on, the resistance 120 is short-circuited to cause current to flow through the triode AC switch 130.

A relay driving circuit 162 turns on the relay 160 on the basis of an input signal from the input monitoring circuit 140. The relay 160 in this example uses a relay driving circuit having longer sensitive time than time (10/8.3 ms) of half-wave of commercial frequency (50 Hz or 60 Hz).

Therefore, when an input signal from the input monitoring circuit 140 turns on, the relay 160 is delayed by the sensitive time in turning on, and thereafter, is self-held in the on-state. When the relay 160 turns on, the resistance 120 and the triode AC switch 130 are short-circuited so that current flows through the relay 160. Thus, the heat generation and power consumption at the resistance 120 and the triode AC switch 130 can be ignored.

Figure 2A:
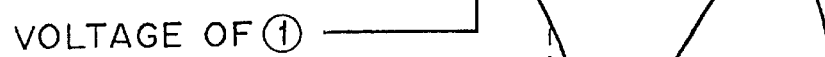
FIGS. 2A to 2D depict a timing chart showing signal waveforms in each portion of the rush current limiting device shown in FIG. 1.
Figure 2B:
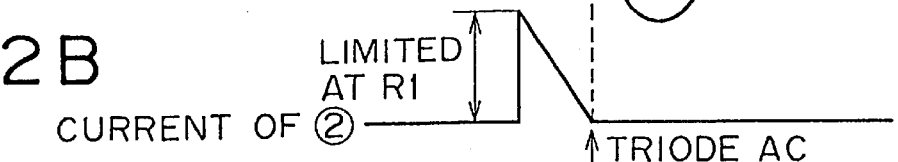

With such structure as described above, the rush current is limited by the resistance value R1 of the resistance 120 immediately after the power switch 112 turns on at point a of FIG. 2 (FIGS. 2A and 2B).

Figure 2C:

When the input signal comes to a zero crossing point, the triode AC switch 130 turns on. This short-circuits the resistance 120, and causes current to flow through the triode AC switch 130 (FIG. 2C).

Figure 2D:

Thereafter, the relay 160 is delayed by the sensitive time in turning on, the resistance 120 and the triode AC switch 130 are short-circuited, and current flows through the relay 160 (FIG. 2D).

By such an operation as described, it becomes possible to effectively limit various rush current, and to solve the problems on heat generation and power consumption for the resistance 120 and the triode AC switch 130.

As described above, in a rush current limiting device of this example, it becomes also possible to limit rush current for a re-throwing operation in a short while, which becomes an obstacle in the use of the thermistor.

Through the use of the triode AC switch 130, it becomes possible to control so as to turn on at the zero crossing point of AC signals, and large current when the current is switched at the resistance 120 can be controlled. Also, by turning on the relay 160 after the triode AC switch 130, the short-circuit current at this time can be reduced because the on-voltage of the triode AC switch 130 is short-circuited.

FIG. 3 is a circuit diagram showing an example of a second structure of a rush current limiting device according to the present invention, and FIG. 4, to having FIGS. 4A to 4H, is a timing chart showing signal waveforms in each portion (① to ⑨ of FIG. 3) of the rush current limiting device shown in FIG. 3.

In the example shown in FIG. 1, in a case where charging current after the triode AC switch 130 and the relay 160 are turned on is small, there is no problem, but if the capacity C1 of the smoothing condenser 118 is large, the charging current becomes larger.

In the second example shown in FIG. 3, by monitoring a voltage difference between the input side (① of FIG. 3) and the output side (④ of FIG. 3) of the rectifier diode bridge 116 and turning on the triode AC switch 130 and the relay 160 at a point of time whereat the voltage difference has become sufficiently small, the charging current is restricted. The voltage on the output side at this time is the voltage at C1 (118) of FIG. 3, and is a value obtained by deducting a voltage drop due to current flowing through R1 (120) from the voltage on the input side.

In FIG. 3, a convenience outlet 110, a power switch 112, a fuse 114, a rectifier diode bridge 116, a smoothing condenser 118, a resistance 120, a triode AC switch 130, an input monitoring circuit 140, diodes 142A and 142B, a zero crossing circuit 150, a relay 160 and a relay driving circuit 162 are the same as in the structure shown in FIG. 1.

In addition, a voltage difference monitoring circuit 170 is a circuit for monitoring a voltage difference between peak voltage on the input side (① of FIG. 3) and voltage on the output side (④ of FIG. 3) of the rectifier diode bridge 116.

To one input terminal of the voltage difference monitoring circuit 170, an input signal to the above-described input monitoring circuit 140 is inputted through a diode 172 and a condenser 174, and the peak is held. To the other input terminal, a voltage signal at the output terminal (④ of FIG. 3) of the rectifier diode bridge 116 is inputted.

In the voltage difference monitoring circuit 170, to the peak voltage from one input terminal, the voltage value at the other input terminal gradually approaches, and when the voltage difference comes to a fixed value or less (b of FIG. 4), a signal, which turns on, is outputted to one input terminal of an AND circuit 180.

To the other input terminal of the AND circuit 180, an output signal from the above-described input monitoring circuit 140 is inputted. Thus, an output signal from the AND circuit 180 is supplied to the zero crossing circuit 150 and the relay driving circuit 162.

With such structure as described above, the rush current is limited by the resistance value R1 of the resistance 120 immediately after the power switch 112 turns on at point a of FIG. 4 (FIGS. 4A and 4B). Also, an output signal from the input monitoring circuit 140 turns on (FIG. 4B), and an input voltage signal at one input terminal of the voltage difference monitoring circuit 170 is peak-held (FIG. 4C).

Thereafter, when charging in the smoothing condenser 118 advances, the voltage difference in the voltage difference monitoring circuit 170 becomes less (FIG. 4C), and an output signal from the voltage difference monitoring circuit 170 turns on (FIG. 4D), whereby an output signal from the AND circuit 180 turns on (FIG. 4E).

Therefore, the triode AC switch 130 turns on at the next zero crossing point by a zero crossing circuit 150, the resistance 120 is short-circuited, and current flows through the triode AC switch 130 (FIG. 4G).

Thereafter, the relay 160 is delayed by the sensitive time in turning on, and the resistance 120 and the triode AC switch 130 are short-circuited so that current flows through the relay 160 (FIG. 4H.

By such an operation as described above, it becomes possible to effectively limit various rush current, to restrain the charging current and to solve the problems on heat generation and power consumption by the resistance 120 and the triode AC switch 130.

Figure 5A:
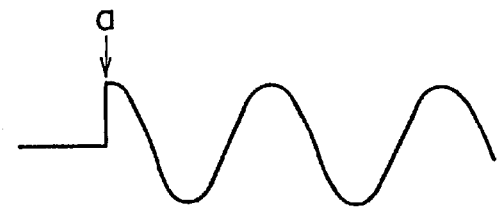
FIG. 5A to 5E are a timing chart showing signal waveforms for explaining the operation when no voltage difference monitoring circuit is provided in the rush current limiting device shown in FIG. 3.
Figure 5B:
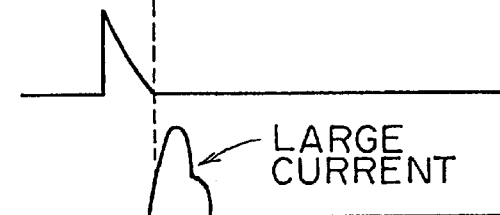
Figure 5C:
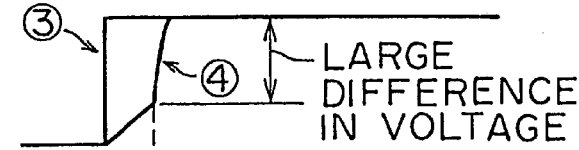
Figure 5D:
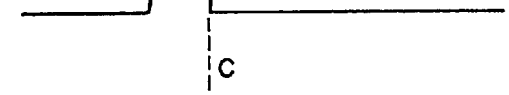
Figure 5E:

In this respect, in a case where no voltage difference monitoring circuit 170 is provided in such structure as described above, the triode AC switch 130 and the relay 160 turn on so that large current flows at a stage at which the voltage difference between on the input side (① of FIG. 3) and on the output side (④ of FIG. 3) of the rectifier diode bridge 116 is large as shown in FIG. 5, having FIGS. 5A trough 5E. Therefore, such large current can be prevented with the provision of the voltage difference monitoring circuit 170 as shown in FIG. 3.

Figure 6:
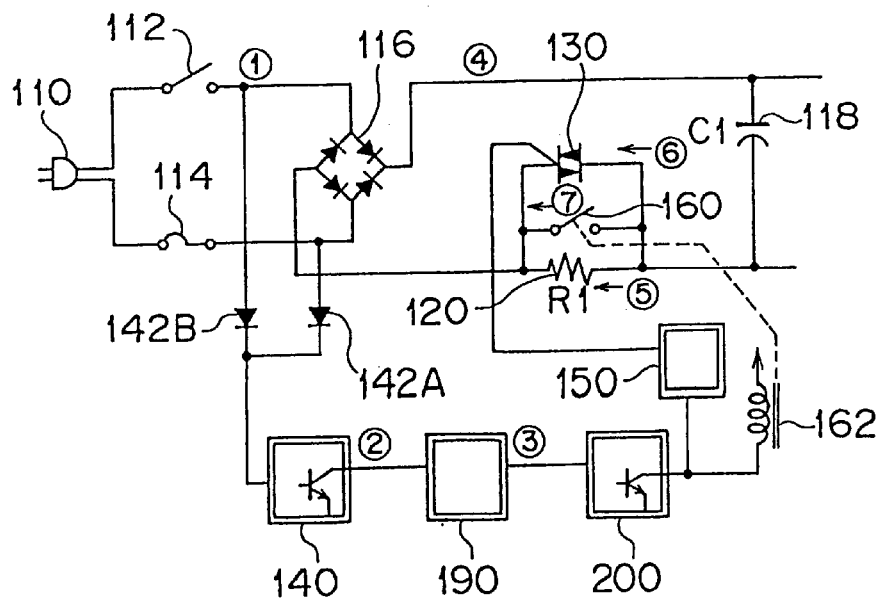
FIG. 6 is a circuit diagram showing an example of third structure of a rush current limiting device according to the present invention.
Figure 9:
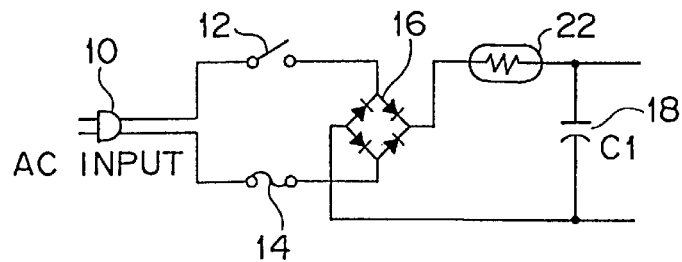
FIG. 9 is a circuit diagram showing an example of a second structure of a conventional rush current limiting device.
Figure 10:
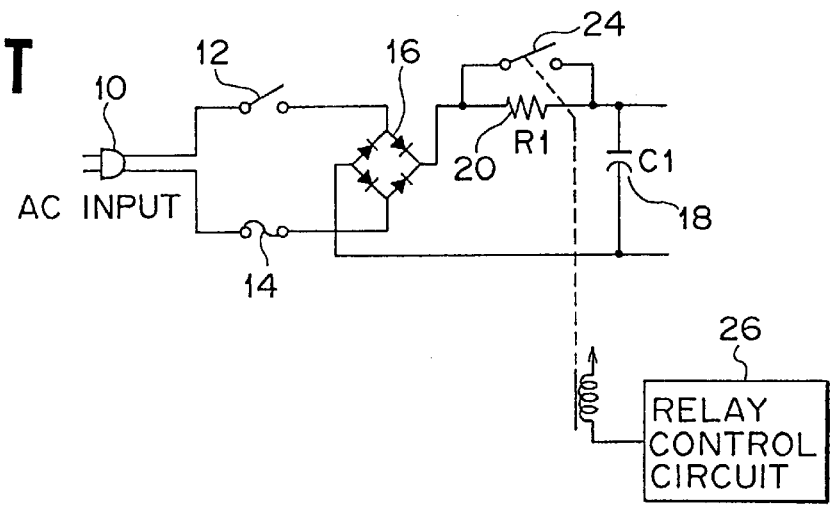
FIG. 10 is a circuit diagram showing an example of a third structure of a conventional rush current limiting device.
Figure 11:
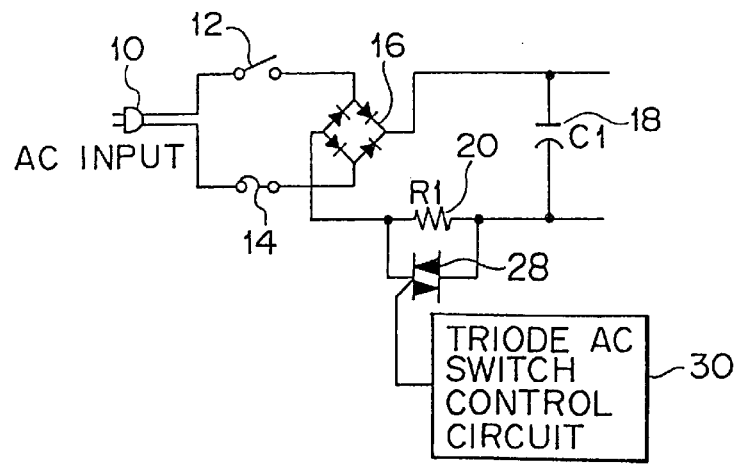
FIG. 11 is a circuit diagram showing an example of a fourth structure of a conventional rush current limiting device.

FIG. 6 is a circuit diagram showing an example of second structure of a rush current limiting device according to the present invention, and FIG. 7, having FIGS. 7A to 7B, is a timing chart showing signal waveforms in each portion (① to ⑦ of FIG. 6) of the rush current limiting device shown in FIG. 6.

This example is an example in which a delay circuit 190 is provided in place of the voltage difference monitoring circuit 170 shown in FIG. 3. More specifically, the delay circuit 190 detects the elapse of a fixed delay time (FIG. 7C after an output signal from the input monitoring circuit 140 turns on, and outputs the output signal from the input monitoring circuit 140 at the timing thus detected to a gate circuit 200.

The gate circuit 200 turns on through an output signal from the delay circuit 190 to supply the output signal to the zero crossing circuit 150 and the relay driving circuit 162. In this respect, the delay time in the delay circuit 190 is set to the same value as timing at which the above-described voltage difference monitoring circuit 170 turns on.

By making delay time, in which the gate circuit 200 turns on, with the delay circuit 190 in this manner, timing, at which the triode AC switch 130 and the relay 160 turn on, is sequentially shifted (FIGS. 7F and 7G), whereby it is possible to restrain excessive charging current.

In a rush current limiting device according to the present invention as described above, resistance means for limiting rush current, semiconductor switching means and mechanical switching means are connected in parallel with one another between the rectifier circuit and the smoothing circuit, and the short-circuiting operation of the semiconductor switching means and the mechanical switching means is arranged to be sequentially controlled by monitoring the power input due to the on-operation of the power switch.

For this reason, it becomes possible to limit rush current even in, for example, a re-throwing operation in a short while, to prevent rush current on any conditions, and there is provided an effect that the problems on heat generation, power consumption and the like caused by the resistance and the triode AC switch can be solved.

What is claimed is:

1. A rush current limiting device for a power circuit having a rectifier circuit for rectifying AC electric power inputted from an input unit; a smoothing circuit for smoothing rectified power from said rectifier circuit; and a power switch for turning on/off the input from said input unit, comprising:

resistance means for limiting rush current provided between said rectifier circuit and said smoothing circuit;

semiconductor switching means connected to said resistance means in parallel, for short-circuiting between said rectifier circuit and said smoothing circuit;

mechanical switching means connected to said resistance means and said semiconductor switching means in parallel, for short-circuiting between said rectifier circuit and said smoothing circuit; and input monitoring means for monitoring power input by an on-operation of said power switch for sequentially controlling a short-circuiting operation in said semiconductor switching means and said mechanical switching means.

2. A rush current limiting device for a power circuit according to claim 1, wherein said semiconductor switching means is a triode AC switch, and said input monitoring means has a zero crossing circuit which turns on said triode AC switch at the zero crossing point of said power input.

3. A rush current limiting device for a power circuit according to claim 2, wherein said input monitoring means has a photo triode AC switch incorporating said zero crossing circuit therein.

4. A rush current limiting device for a power circuit according to claim 1, wherein said mechanical switching means is delayed in turning on until a time later than said semiconductor switching means on the basis of a control signal from said input monitoring means.

5. A rush current limiting device for a power circuit according to claim 4, wherein said mechanical switching means is a relay.

6. A rush current limiting device for a power circuit according to claim 4, wherein said mechanical switching means is delayed in turning on until a time later than said semiconductor switching means by a delay based on sensitive time.

7. A rush current limiting device for a power circuit according to claim 1, wherein said input monitoring means has a detecting circuit for detecting a potential difference between an input stage and an output stage of said rectifier circuit, and after said potential difference becomes a predetermined value, sequentially controls a short-circuiting operation in said semiconductor switch means and said mechanical switching means.

8. A rush current limiting device for a power circuit according to claim 1, wherein said input monitoring means has a delay circuit for detecting a fixed delay time, and after an on-operation of said power switch, sequentially controls a short-circuiting operation in said semiconductor switching means and said mechanical switching means after an elapse of delay time by said delay circuit.

9. A rush current limiting device for a power circuit according to claim 1, wherein said rectifier circuit is constituted by a diode bridge, and said smoothing circuit is constituted by a smoothing condenser.

10. A rush current limiting device for a power circuit having a rectifier circuit for rectifying AC electric power inputted from an input unit; a smoothing circuit for smoothing rectified power from said rectifier circuit; and a power switch for turning on/off the input from said input unit, comprising:
  a resistance limiting rush current provided between said rectifier circuit and said smoothing circuit;
  a semiconductor switch connected to said resistance in parallel, for short-circuiting between said rectifier circuit and said smoothing circuit;
  mechanical switch connected to said resistance and said semiconductor switch in parallel, for short-circuiting when commanded between said rectifier circuit and said smoothing circuit; and
  an input monitoring circuit monitoring power input by an on-operation of said power switch to sequentially control a short-circuiting operation in said semiconductor switch and said mechanical switch.

11. A rush current limiting device for a power circuit according to claim 10, wherein said semiconductor switch is a triode AC switch, and said input monitoring circuit has a zero crossing circuit which turns on said triode AC switch at the zero crossing point of said power input.

12. A rush current limiting device for a power circuit according to claim 11, wherein said input monitoring circuit has a photo triode AC switch incorporating said zero crossing circuit therein.

13. A rush current limiting device for a power circuit according to claim 10, wherein said mechanical switch is delayed in turning on to a time later than said semiconductor switch on the basis of a control signal from said input monitoring circuit.

14. A rush current limiting device for a power circuit according to claim 13, wherein said mechanical switch is a relay actuated by a relay driving circuit responsive to said input monitoring circuit.

15. A rush current limiting device for a power circuit according to claim 13, wherein said mechanical switch is delayed in turning on to a time later than said semiconductor switch by a delay based on sensitive time of said relay driving circuit.

16. A rush current limiting device for a power circuit according to claim 10, wherein said input monitoring circuit includes a detecting circuit for detecting a potential difference between an input stage and an output stage of said rectifier circuit, and after said potential difference becomes a predetermined value, sequentially controls a short-circuiting operation in said semiconductor switch and said mechanical switch.

17. A rush current limiting device for a power circuit according to claim 10, wherein said input monitoring circuit includes a delay circuit for detecting a fixed delay time, and after an on-operation of said power switch, sequentially controls a short-circuiting operation in said semiconductor switch and said mechanical switch after an elapse of delay time by said delay circuit.

18. A rush current limiting device for a power circuit according to claim 10, wherein said rectifier circuit is constituted by a diode bridge, and said smoothing circuit is constituted by a smoothing condenser.

19. A rush current limiting device for a power circuit according to claim 10, further including a voltage difference monitoring circuit for monitoring a voltage difference between peak voltage on an input side and voltage on the output side of the rectifier bridge.

20. A rush current limiting device for a power circuit according to claim 19, wherein said rectifier bridge is a diode bridge.

* * * * *